United States Patent
Boutaud

(10) Patent No.: US 10,552,512 B2
(45) Date of Patent: Feb. 4, 2020

(54) SYSTEM AND METHOD FOR DETERMINING SENSOR MARGINS AND/OR DIAGNOSTIC INFORMATION FOR A SENSOR

(71) Applicant: Rockwell Automation Technologies, Inc., Mayfield Heights, OH (US)

(72) Inventor: Frederic Boutaud, Lexington, MA (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 16/157,323

(22) Filed: Oct. 11, 2018

(65) Prior Publication Data
US 2019/0042545 A1    Feb. 7, 2019

Related U.S. Application Data

(63) Continuation of application No. 14/659,179, filed on Mar. 16, 2015, now Pat. No. 10,133,702.

(51) Int. Cl.
*G06F 17/18* (2006.01)
*G05B 23/02* (2006.01)

(52) U.S. Cl.
CPC .......... *G06F 17/18* (2013.01); *G05B 23/024* (2013.01); *G05B 2219/37525* (2013.01)

(58) Field of Classification Search
CPC ................. G06F 17/18; G05B 23/024; G05B 2219/37525
See application file for complete search history.

(56) References Cited

U.S. PATENT DOCUMENTS

| | | |
|---|---|---|
| 2004/0051798 A1 | 3/2004 | Kakarala et al. |
| 2005/0092088 A1 | 5/2005 | Blakley |
| 2005/0267710 A1 | 12/2005 | Heavner, III et al. |
| 2013/0110438 A1 | 5/2013 | Rinkel et al. |
| 2013/0191681 A1 | 7/2013 | Moiseev et al. |
| 2014/0122800 A1 | 5/2014 | Williams |
| 2014/0278234 A1 | 9/2014 | Chang et al. |

FOREIGN PATENT DOCUMENTS

EP    1 401 196 A1    3/2004

OTHER PUBLICATIONS

Extended European Search Report dated Jul. 27, 2016 for European Application Serial No. 16160597.7, 8 pages.
European Office Action dated Sep. 26, 2016 for European Application Serial No. 16160597.7, 2 pages.
(Continued)

*Primary Examiner* — Stephen W Smoot
(74) *Attorney, Agent, or Firm* — Amin, Turocy & Watson, LLP

(57) ABSTRACT

Systems and techniques for determining sensing margins and/or diagnostic information associated with a sensor are presented. A statistics component generates statistical data based on sensor data associated with a sensing device. A margin component generates sensing margins for the sensing device based on the statistical data. An output component generates an indicator for a changing condition associated with the sensing device based on the sensing margins. In an aspect, a diagnostic component generates diagnostic data for the sensing device based on the statistical data.

20 Claims, 13 Drawing Sheets

(56) References Cited

OTHER PUBLICATIONS

Non-Final Office Action received for U.S. Appl. No. 14/659,179 dated May 24, 2017, 26 pages.
Final Office Action received for U.S. Appl. No. 14/659,179 dated Sep. 14, 2017, 15 pages.
Non-Final Office Action received for U.S. Appl. No. 14/659,179 dated Jan. 12, 2018, 17 pages.
Final Office Action received for U.S. Appl. No. 14/659,179 dated May 11, 2018, 19 pages.

SYSTEM AND METHOD FOR DETERMINING SENSOR MARGINS AND/OR DIAGNOSTIC INFORMATION FOR A SENSOR

CROSS-REFERENCE TO RELATED APPLICATIONS

This application is a continuation of and claims priority to U.S. patent application Ser. No. 14/659,179, filed on Mar. 16, 2015 entitled, "SYSTEM AND METHOD FOR DETERMINING SENSOR MARGINS AND/OR DIAGNOSTIC INFORMATION FOR A SENSOR", the entirety of which is hereby incorporated by reference herein.

BACKGROUND

The subject matter disclosed herein relates generally to sensor devices, and, more particularly, to determining sensing margins and/or diagnostic information associated with a sensor.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes a statistics component, a margin component and an output component. The statistics component generates statistical data based on sensor data associated with a sensing device. The margin component generates sensing margins for the sensing device based on the statistical data. The output component generates an indicator for a changing condition associated with the sensing device based on the sensing margins.

One or more embodiments also provide a method for generating, by a device comprising at least one processor, statistical data based on sensor data associated with a sensor of the device, for generating, by the device, operating margins for the sensor based on the statistical data, and for generating, by the device, an indicator for a sensing decision associated with the sensor based on the operating margins.

Also, according to one or more embodiments, a non-transitory computer-readable medium is provided having stored thereon instructions that, in response to execution, cause a device comprising a processor to perform operations, the operations comprising generating signal distribution data for sensor data associated with a sensor device, generating sensing margins for the sensor device based on a characterization of the signal distribution data, and generating an indicator for a sensing decision associated with the sensor device based on the sensing margins.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
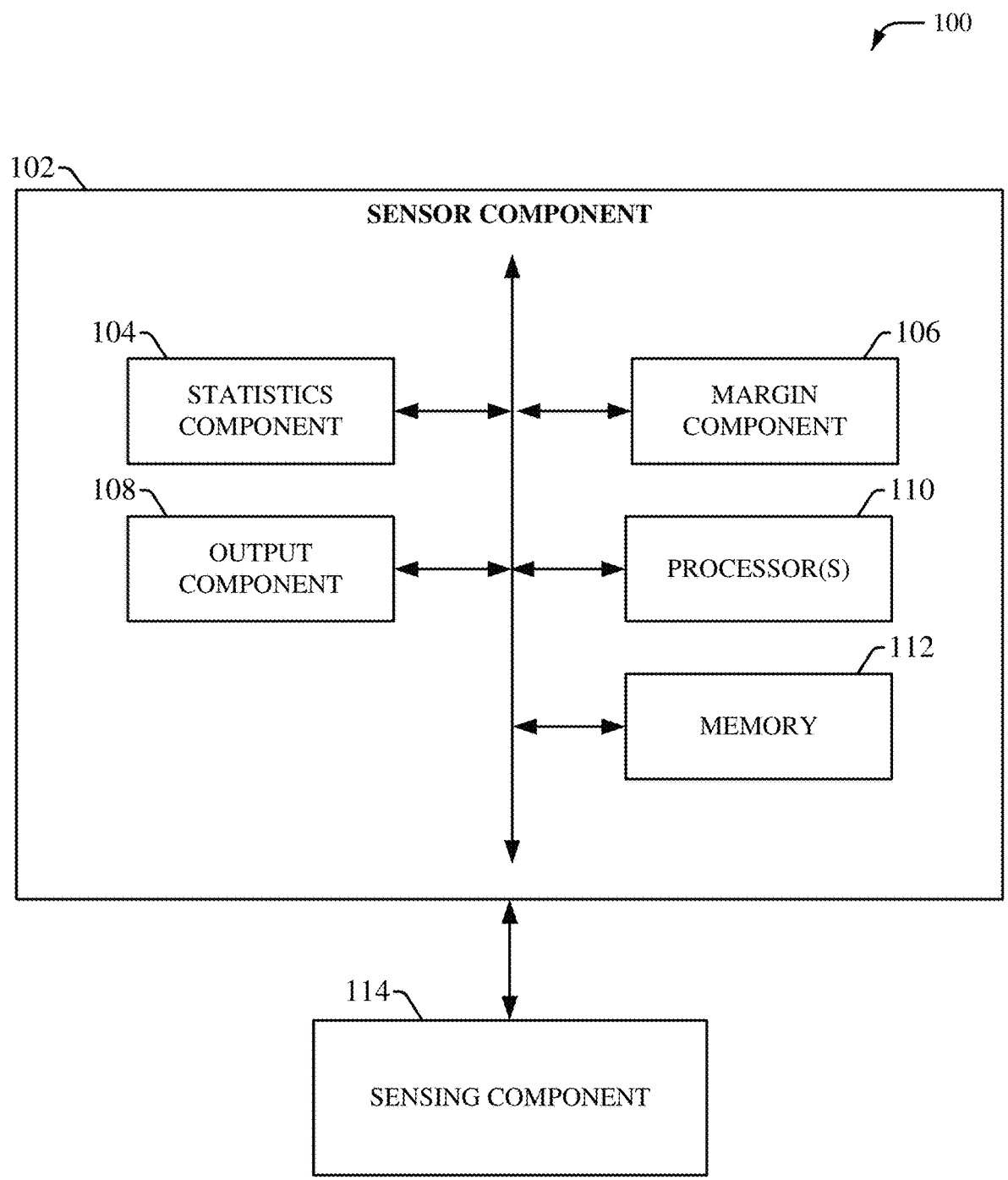
FIG. 1 illustrates a high-level block diagram of a sensor component, in accordance with various aspects and implementations described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "controller," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, interface, controller, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Sensor devices are central to the operation of numerous modern automation systems. These sensor devices can interact with industrial devices on the plant floor of a plant facility (e.g., an industrial facility) to control automated processes relating to such objectives as product manufacture, product processing, material handling, batch processing, supervisory control, and other such applications. Sensor devices need to operate in a robust manner while producing reliable sensing information. Sensing information can include, for example, detection of an object that is indicated by switching a state of logic output for a sensor device (e.g., turning ON or OFF a logic output of a sensor device). Often times, sensing margins (e.g., operating margins) are established for a sensing device during an installation process associated with a user application (e.g., an industrial application). Establishment of the sensing margins can improve sensing function of the sensor device (e.g., to minimize false detection of an object, to minimize missed detection of an object, etc.). Sensing margins can be based on signal level perceived by a sensor relative to a threshold level employed by the sensor to make a sensing decision. In certain instances, a sensor device can include an indicator related to the sensing margins. However, sensing margins of conventional sensor devices can be affected by noise. For example, noise (e.g., mechanical vibration, electromagnetic perturbations, etc.) can cause a sensor device to false trigger or miss a detection if the sensing margins are not set high enough. Slow moving noise (e.g., dust in the air, buildup of dirt in front of a sensor lens, buildup of welding slag close to an inductive sensor, etc.) can also decrease accuracy and/or performance of a sensor device (e.g., sensing margin accuracy can be reduced as a result of noise, robustness of the sensor device and/or sensing margins can be reduced as a result of noise, etc.).

To address these and other issues, one or more embodiments of the present disclosure generate and/or employ statistical information associated with a sensor to determine sensing margins and/or diagnostic information for a sensor device. In an aspect, statistical mean information, standard deviation information, signal level distribution information, noise level information, signal to noise ratio information, noise distribution information and/or other statistical information can be generated and/or employed to determine sensing margins and/or diagnostic information associated with a sensor device. In another aspect, sensing margins and/or diagnostic information for a sensor device can be determined based on a characterization of signal distribution information associated with a sensor. The effect of noise on sensing margins of the sensor can be minimized by generating and/or employing the statistical information to determine the sensing margins. Therefore, accuracy of sensing margins and/or diagnostic information associated with a sensor device can be improved (e.g., level of noise at a decision point can be reduced, number of false alarms associated with a sensor device can be reduced, number of missed detections associated with a sensor device can be reduced, repeatability of sensing decisions can be improved, sensing condition associated with a sensor device can be allowed to degrade, etc.). Furthermore, overall robustness, reliability and/or performance of sensing function for a sensor device can be improved.

FIG. 1 illustrates an example system 100 for configuring sensing margins associated with a sensor. The sensor can be a sensor (e.g., a sensor device) associated with at least one manufacturing process (e.g., at least one industrial process). System 100 includes at least a sensor component 102, according to one or more embodiments of this disclosure.

Although FIG. 1 depicts certain functional components as residing on the sensor component 102, it is to be appreciated that one or more of the functional components illustrated in FIG. 1 may reside on a separate device relative to the sensor component 102 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. The system 100 can be associated with a sensor device (e.g., an industrial sensor device, a presence sensor device, a measurement sensor device, a proximity sensor device, an inductive proximity sensor device, a capacitive proximity sensor device, an ultrasonic proximity sensor device, a photosensor device, a photoelectric sensor device, another type of sensor device, etc.), application solutions, presence sensing, condition sensing, data sensing, safety components, safety relays, a safety system, another industrial device, another industrial process and/or another industrial system.

The sensor component 102 can include a statistics component 104, a margin component 106, an output component 108, one or more processors 110, and memory 112. In various embodiments, one or more of the statistics component 104, the margin component 106, the output component 108, the one or more processors 110, and the memory 112 can be electrically and/or communicatively coupled to one another to perform one or more of the functions of the sensor component 102. The one or more processors 110 can perform one or more of the functions described herein with reference to the systems and/or methods disclosed. In some embodiments, components 104, 106 and 108 can comprise software instructions stored on memory 112 and executed by processor(s) 110. Memory 112 can be a computer-readable storage medium storing computer-executable instructions and/or information for performing the functions described herein with reference to the systems and/or methods disclosed. The sensor component 102 may also interact with other hardware and/or software components not depicted in FIG. 1. For example, processor(s) 110 may interact with one or more external user interface devices, such as a keyboard, a mouse, a display monitor, a touchscreen, another sensor, a network, a safety device, or other such interface devices.

The statistics component 104 can generate statistical data (e.g., statistical information) based on sensor data associated with a sensing component 114. The sensor data can be measurement data associated with the sensing component 114. The measurement data can be associated with measurement (e.g., amplitude, strength, etc.) of a set of electrical outputs generated by the sensing component 114 in response to a set of signals received by the sensing component 114. The sensing component 114 can be a device for detecting and/or signaling a changing condition associated with an industrial process (e.g., a manufacturing process). The sensing component 114 can be communicatively coupled to the sensor component 102. Alternatively, the sensor component 102 can include the sensing component 114.

The sensing component 114 can be configured with sensing functionality. The sensing component 114 can detect and/or signal a changing condition (e.g., presence of an object, absence of an object, change in distance, etc.) in response to signal(s) received by the sensing component 114. For example, the sensing component 114 can detect presence of an object, detect absence of an object, detect a change in distance associated with an object, detect a change in size associated with an object, detect a change in color associated with an object, etc. The sensing component 114 can therefore be employed to monitor and/or control an industrial process (e.g., a manufacturing process). The sensing component 114 can be a sensor device associated with a receiver, a transmitter (e.g., an emitter), a set of transducers and/or signal conditioning functionality. The sensing component 114 can be associated with a presence sensor, a measurement sensor, a proximity sensor (e.g., an inductive proximity sensor, a capacitive proximity sensor, an ultrasonic proximity sensor, etc.), a photosensor, a photoelectric sensor, or another type of sensor. In an implementation, the sensing component 114 can detect changes based on ultrasonic transducer pulses generated and received by the sensing component 114 to facilitate determining a changing condition. In another implementation, the sensing component 114 can detect presence or absence of light generated by a light source (e.g., a light source associated with the sensing component 114) to facilitate determining a changing condition. In yet another implementation, the sensing component 114 can detect changes in amplitude of oscillation associated with an oscillator (e.g., an oscillator associated with a coil and ferrite core assembly, an oscillator associated with a capacitive probe/plate, etc.) to facilitate determining a changing condition.

In an aspect, the sensor data can be a distribution of measurement data associated with the sensing component 114. For example, multiple measurements associated with the sensing component 114 can be stored and/or arranged as a distribution of measurements. Therefore, the statistics component 104 can generate the statistical data based on a distribution of measurement data associated with the sensing component 114. In one example, a signal received by the sensing component 114 can be associated with particular sensor data. Furthermore, one or more other signals previously received by the sensing component 114 can be associated with other sensor data. As such, the statistics component 104 can generate a distribution of data (e.g., a distribution of measurement data) associated with the sensing component 114 based on the particular sensor data associated with the signal received by the sensing component 114 and the other sensor data associated with the one or more other signals previously received by the sensing component 114.

The statistical data generated by the statistics component 104 can characterize the sensor data associated with the sensing component 114. For example, the statistical data generated by the statistics component 104 can characterize the distribution of the measurement data associated with the sensing component 114. In an aspect, the statistical data can be signal distribution characteristics of the sensor data (e.g., the measurement data) associated with the sensing component 114. For example, the statistical data can include statistical mean data, standard deviation data, variation data, noise level data, signal to noise ratio data, noise distribution data, statistical median data, statistical mode data and/or other statistical data. The statistical data can be, in one example, signal level statistics of the sensor data associated with the sensing component 114. For example, the statistical data generated by the statistics component 104 can be associated with signal strength (e.g., amplitude) of the sensor data. Therefore, the statistics component 104 can generate the statistical data based on amplitude of signal data associated with the sensing component 114. In certain implementations, the statistics component 104 can generate probability density information corresponding to probability that a signal received by the sensing component 114 is associated with a particular amplitude based on the sensor data. For example, the statistics component 104 can generate a signal level distribution based on the sensor data. The signal level distribution can be associated with at least a first state and a second state of the sensing component 114 (e.g., in certain implementations a signal level distribution can be associated with more than two states). The first state can be, for example, a low state associated with a low state threshold and the second state can be a high state associated with a high state threshold. The statistics component 104 can generate the signal level distribution based on a plurality of signals received and/or generated by the sensing component 114.

The margin component 106 can generate and/or modify sensing margins (e.g., operating margins) for the sensing component 114 based on the statistical data. For example, the margin component 106 can generate and/or modify sensing margins (e.g., operating margins) for the sensing component 114 based on statistical mean data, standard deviation data, variation data, noise level data, signal to noise ratio data, noise distribution data, statistical median data, statistical mode data and/or other statistical data associated with the sensor data. In certain implementations, the margin component 106 can generate and/or modify sensing margins (e.g., operating margins) for the sensing component 114 based on a characterization of probability density information (e.g., a signal level distribution, signal distribution data, etc.) associated with the sensor data. In an aspect, the margin component 106 can generate the sensing margins for the sensing component 114 based on a characterization of probability density information relative to previously determined sensing margins for the sensing component 114. The margin component 106 can generate the sensing margins for the sensing component 114, for example, based on a statistical mean data and/or standard deviation data associated with the probability density information relative to previously determined sensing margins for the sensing component 114. Additionally or alternatively, the margin component 106 can generate and/or modify the sensing margins for the sensor based on noise level of the sensor data, a signal to noise ratio of the sensor data and/or noise distribution of the sensor data. However, it is to be appreciated that the margin component 106 can generate the sensing margins for the sensing component 114 based on other statistical data associated with the sensor data and/or the sensing component 114.

The output component 108 can generate an indicator for a changing condition (e.g., a sensing decision) associated with the sensing component 114 based on the sensing margins and/or the statistical data. For example, the output component 108 can generate an indicator associated with presence of an object, absence of an object, change in distance associated with an object, change in size associated with an object, change in color associated with an object, etc. based on the sensing margins determined by the margin component 106. An indicator generated by the output component 108 can be associated with binary logic (e.g., a good margin state or a poor margin state, etc.). In another example, an indicator generated by the output component 108 can be associated with multiple levels of quantization (e.g., more than two levels of quantization, etc.). In an implementation, the output component 108 can transmit a state of an indicator to a controller (e.g., a programmable logic controller, etc.) via a digital communication link (e.g., a serial port of an IO-Link, etc.) In an aspect, the output component 108 can be associated with solid-state output. In another aspect, the output component 108 can be associated with analog output. The output component 108 can generate an electrical signal associated with a changing condition (e.g., a sensing decision) based on the sensing margins determined by the margin component 106. Additionally or alternatively, the output component 108 can modulate one or more light sources (e.g., one or more light-emitting diodes, etc.) based on the sensing margins determined by the margin component 106. In certain implementations, the output component 108 can generate a signal associated with a changing condition (e.g., a sensing decision) that can control one or more sensor outputs based on the statistical data and/or the sensing margins. This can include, for example, sending a control signal to an industrial device or controller to perform a control action, initiating a safety action (e.g., removing power from an industrial device, switching a mode of an industrial device, etc.), sending a feedback message to a display device (e.g., a human-machine interface, a personal mobile device, etc.), or other such output. In an aspect, the sensor component 102 can be employed during a calibration mode and/or an installation mode associated with at least one manufacturing process (e.g., at least one industrial process).

Figure 2:
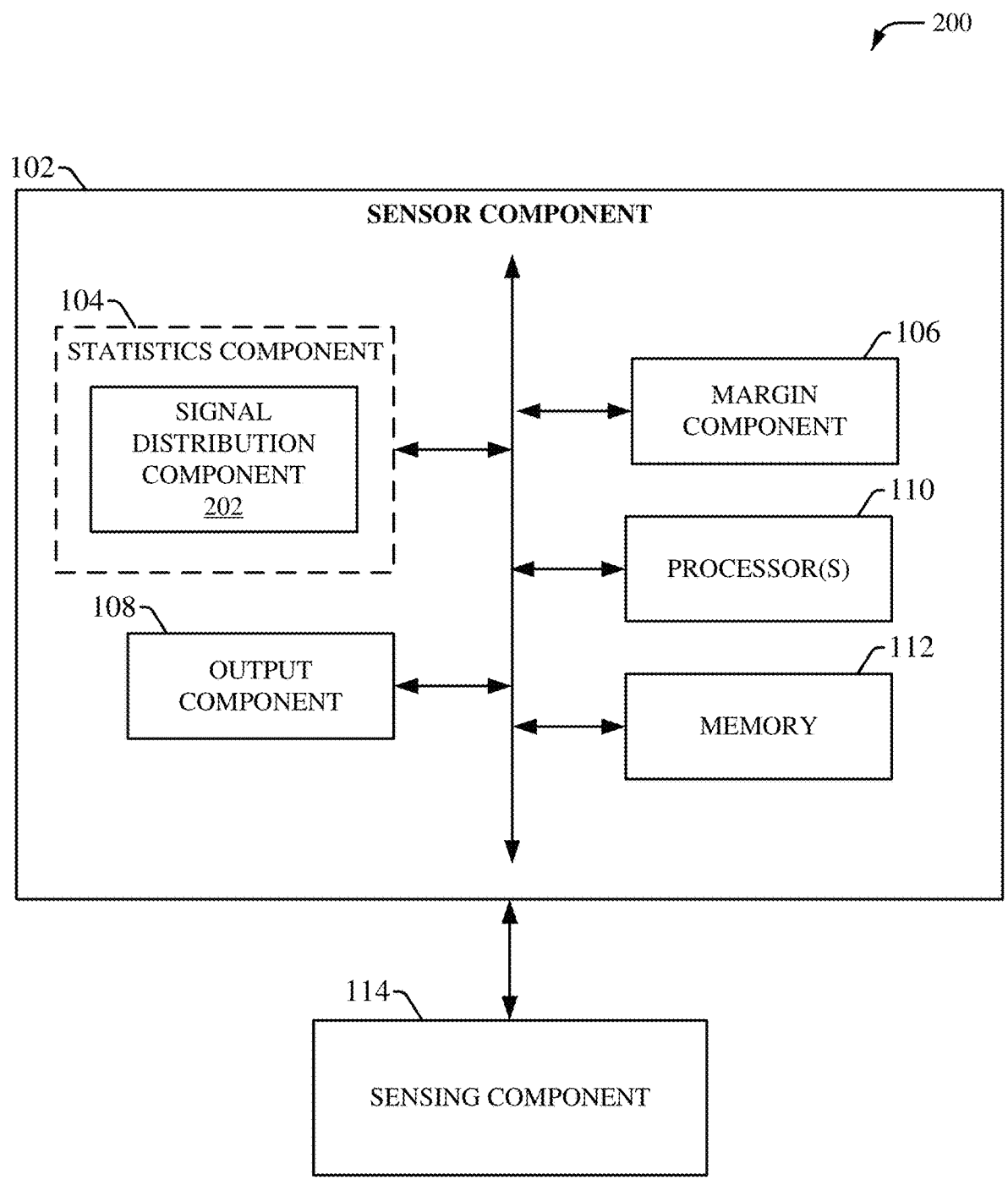
FIG. 2 illustrates another high-level block diagram of a sensor component, in accordance with various aspects and implementations described herein.

FIG. 2 illustrates an example system 200 for configuring sensing margins associated with a sensor. The sensor can be a sensor (e.g., a sensor device) associated with at least one manufacturing process (e.g., at least one industrial process). System 200 includes at least the sensor component 102. The sensor component 102 can include the statistics component 104, the margin component 106, the output component 108, the one or more processors 110 and the memory 112. The statistics component 104 can include at least a signal distribution component 202. In one implementation, the sensing component 114 can be communicatively coupled to the sensor component 102. In another implementation, the sensor component 102 can include the sensing component 114.

The signal distribution component 202 can generate signal distribution data (e.g., signal distribution information) based on the sensor data associated with the sensing component 114. For example, the signal distribution component 202 can generate signal distribution data (e.g., signal distribution information) based on measurement data associated with the sensing component 114. The measurement data associated with the sensing component 114 can include, for example, amplitude (e.g., signal level, signal strength, etc.) of signals received and/or generated by the sensing component 114. However, it is to be appreciated that the measurement data associated with the sensing component 114 can include other measurements associated with signals received and/or generated by the sensing component 114.

In an aspect, the signal distribution data can be associated with a signal level distribution (e.g., a signal amplitude distribution) related to the sensing component 114. The signal level distribution can be associated with probability density data (e.g., probability density of a signal associated with the sensing component 114 reaching a particular amplitude). The signal level distribution can define at least a first state (e.g., a high state) and a second state (e.g., a low state) for the sensing component 114. The first state can be associated with a first threshold (e.g., a high state threshold) and the second state can be associated with a second threshold (e.g., a low state threshold). The first state (e.g., the high state) can be defined as signal strength associated with the sensing component 114 being above the first threshold (e.g., the high state threshold). The second state (e.g., the low state) can be defined as signal strength associated with the sensing component 114 being below the second threshold (e.g., the low state threshold). The state threshold (e.g., the high state) can be associated with a first pattern of the signal distribution data (e.g., a peak associated with the signal distribution data) and the second state (e.g., the low state) can be associated with a second pattern of the signal distribution data (e.g., another peak associated with the signal distribution data). A margin associated with the first state and the second state of the signal distribution data can define sensing margins for the sensing component 114.

Figure 3:
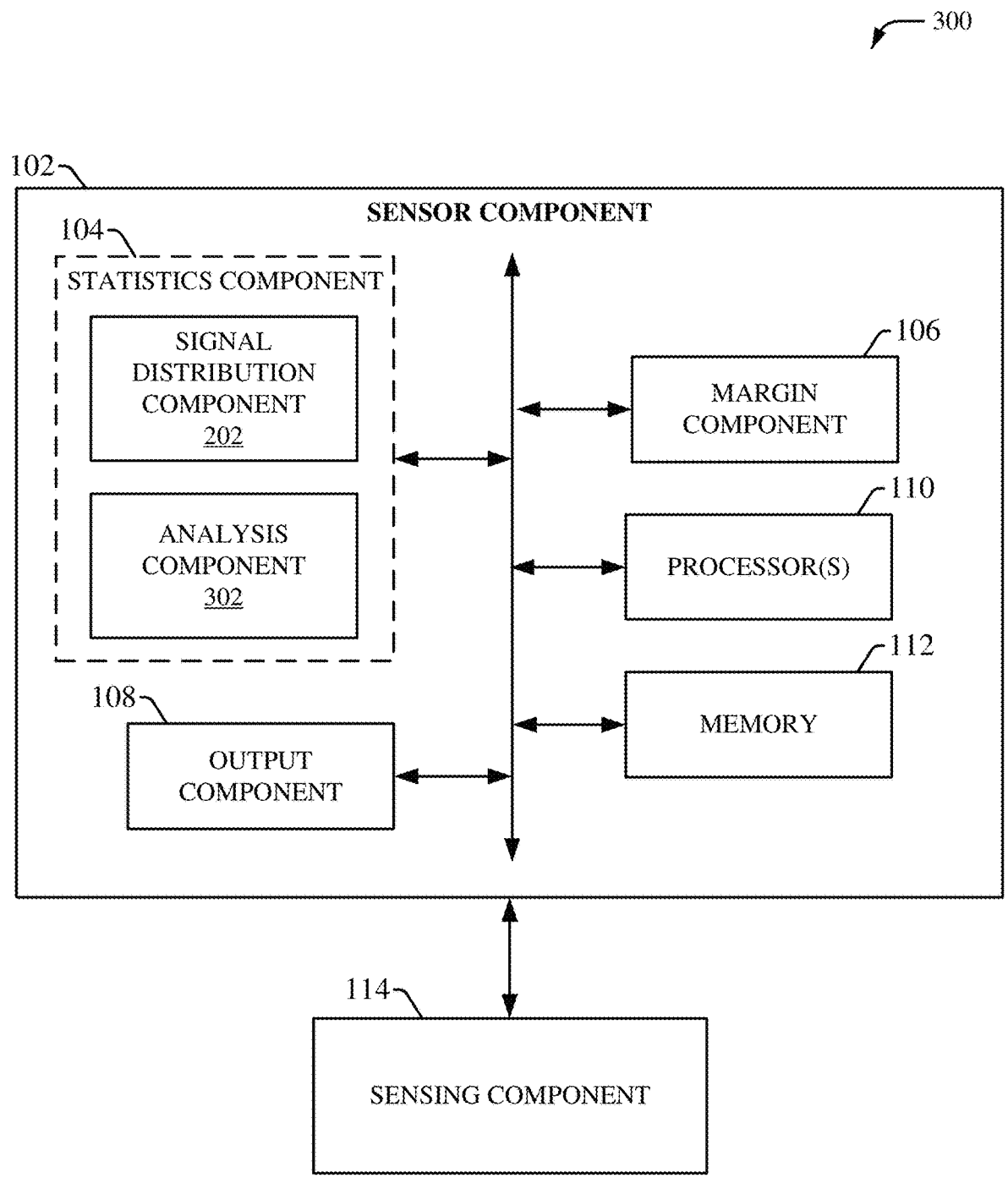
FIG. 3 illustrates yet another high-level block diagram of a sensor component, in accordance with various aspects and implementations described herein.

FIG. 3 illustrates an example system 300 for configuring sensing margins associated with a sensor. The sensor can be a sensor (e.g., a sensor device) associated with at least one manufacturing process (e.g., at least one industrial process). System 300 includes at least the sensor component 102. The sensor component 102 can include the statistics component 104, the margin component 106, the output component 108, the one or more processors 110 and the memory 112. The statistics component 104 can include the signal distribution component 202 and an analysis component 302. In one implementation, the sensing component 114 can be communicatively coupled to the sensor component 102. In another implementation, the sensor component 102 can include the sensing component 114.

The analysis component 302 can analyze the signal distribution data generated by the signal distribution component 202. For example, the analysis component 302 can characterize the signal distribution data generated by the signal distribution component 202 (e.g., the analysis component 302 can analyze the signal distribution data to identify specific patterns and/or characteristics associated with the signal distribution data). The analysis component 302 can determine signal level statistics (e.g., signal strength statistics, signal amplitude statistics, etc.) associated with the signal distribution data. Statistical data determined by the analysis component 302 can include, for example, statistical mean data, standard deviation data, variation data, noise level data, signal to noise ratio data, noise distribution data, statistical median data, statistical mode data and/or other statistical data associated with the signal distribution data. In an aspect, the margin component can generate and/or modify sensing margins for the sensing component 114 based on the analysis of the signal distribution data by the analysis component 302. For example, the first threshold and/or the second threshold associated with the signal distribution data can be determined and/or modified based on the analysis of the signal distribution data by the analysis component 302.

Figure 4:
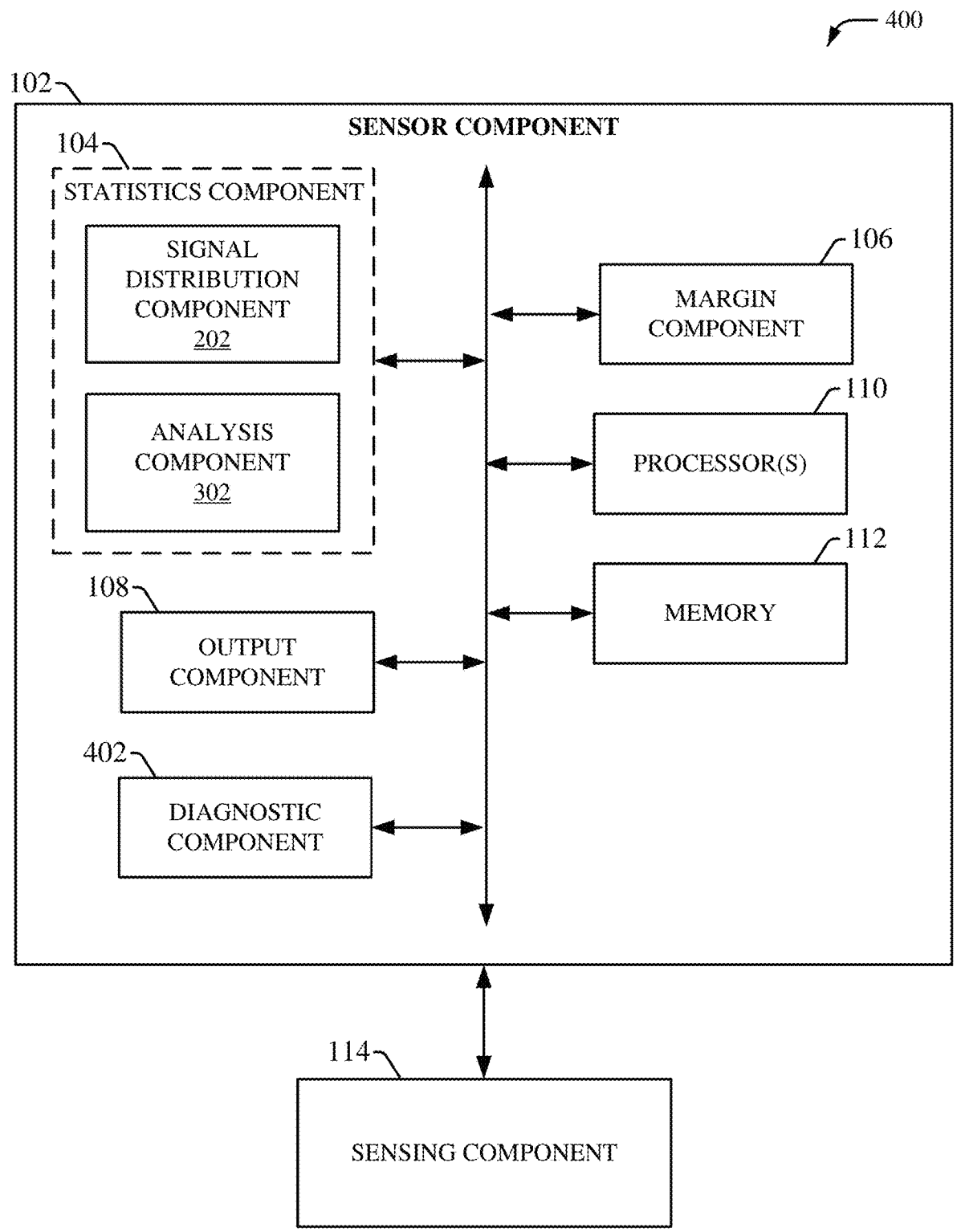
FIG. 4 illustrates yet another high-level block diagram of a sensor component, in accordance with various aspects and implementations described herein.

FIG. 4 illustrates an example system 400 for determining diagnostic data associated with a sensor. The sensor can be a sensor (e.g., a sensor device) associated with at least one manufacturing process (e.g., at least one industrial process). System 400 includes at least the sensor component 102. The sensor component 102 can include the statistics component 104, the margin component 106, the output component 108, the one or more processors 110, the memory 112 and/or a diagnostic component 402. The statistics component 104 can include the signal distribution component 202 and/or the analysis component 302. In one implementation, the sensing component 114 can be communicatively coupled to the sensor component 102. In another implementation, the sensor component 102 can include the sensing component 114.

The diagnostic component 402 can generate diagnostic data based on the statistical data and/or the sensor data. The diagnostic data can be associated with, for example, performance of the sensing component 114. For example, measure of characteristics of signal distribution data and/or change associated with the signal distribution data can be an indicator of robustness and/or possible degradation associated with the sensing component 114. In another example, a change in the statistical data and/or the sensor data can be an indication of a change associated with a sensor, an application related to a sensor and/or a physical area around a sensor. In yet another example, a change in a shape of a distribution can be an indication of a change associated with a sensor, a change associated with an application related to a sensor and/or a physical area around a sensor, etc. A change in the statistical data, the sensor data and/or a shape of a distribution can be, for example, an indication that preventive maintenance is required. Therefore, the diagnostic component 402 can generate diagnostic data associated with characteristics of signal distribution data and/or change associated with the signal distribution data. In an aspect, the diagnostic component 402 can generate a signal associated with diagnostic data. For, the diagnostic component 402 can generate a warning signal in response to a particular characterization of the signal distribution data. Therefore, the diagnostic component 402 can generate a warning of a possible faulty sensor device based on the statistical data and/or the sensor data. The diagnostic component 402 can also send a signal associated with diagnostic data to an industrial device or controller to perform a control action, initiate a safety action (e.g., removing power from an industrial device, switching a mode of an industrial device, etc.) based on the diagnostic data, send diagnostic data and/or a diagnostic message to a display device (e.g., a human-machine interface, a user device, a personal mobile device, etc.), be employed for preventative maintenance, be employed for to monitor health of a sensor device, etc. In an implementation, the statistics component 104 (e.g., the signal distribution component 202 and/or the analysis component 302), the margin component 106, the output component 108 and/or the diagnostic component 402 can be associated with flash memory.

Figure 5:
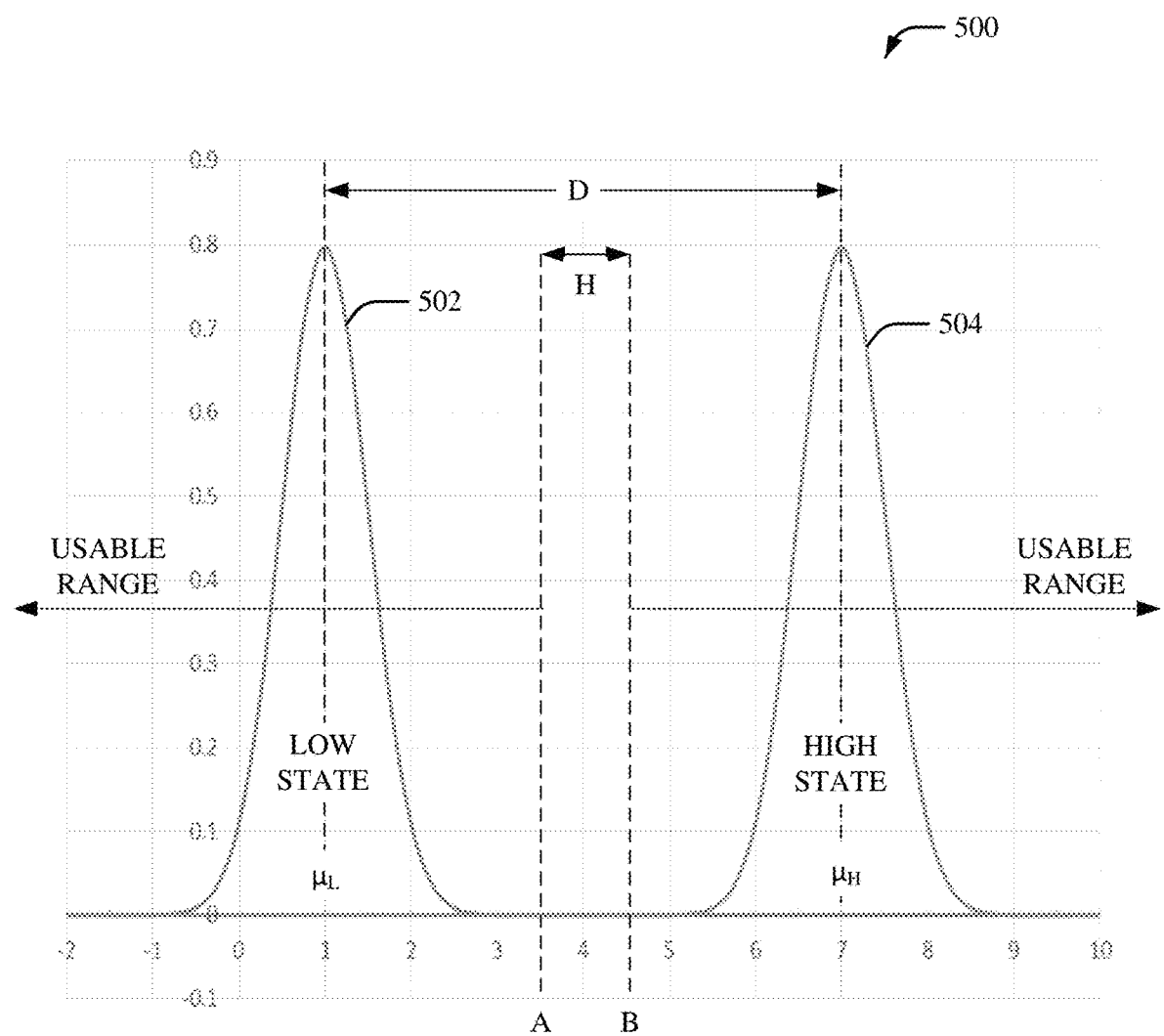
FIG. 5 illustrates an exemplary signal level distribution.

FIG. 5 represents a signal level distribution 500 associated with a sensor (e.g., the sensing component 114). For example, the signal level distribution 500 can represent signal amplitude distribution (e.g., signal strength distribution) in each state (e.g., a low state and a high state) of the sensing component 114. The signal level distribution 500 can relate to a measurement (or measurements) that corresponds to a level of a signal. However, it is to be appreciated that the signal level distribution 500 and/or a 'signal level distribution' as disclosed herein can be a different type of distribution. In an aspect, the signal level distribution 500 can be associated with the signal distribution component 202. The signal level distribution 500 can represent probability density of a signal associated with the sensing component 114 reaching a particular amplitude. For example, a low state shown in signal level distribution 500 can correspond to absence of a target (e.g., a reflector associated with a sensor) and a high state shown in signal level distribution 500 can correspond to presence of a target (e.g., a reflector associated with a sensor). Noise for a sensor associated with signal level distribution 500 can be random with a normal distribution $N(\mu,\sigma)$, where $\mu$ is mean and $\sigma$ is standard deviation, and where a first distribution 502 and a second distribution 504 of the signal level distribution 500 are associated with the same standard deviation 6.

When in the high state, signal strength is required to go below a release point threshold A (e.g., a low threshold A) in order for a sensor associated with the signal level distribution 500 (e.g., the sensing component 114) to switch to the low state. When in the low state, signal strength is required to go above an on point threshold B (e.g., a high threshold B) in order for a sensor associated with the signal level distribution 500 (e.g., the sensing component 114) to switch to the high state. For example, an area to the left of the release point threshold A is a usable range for a first state (e.g., a low state) of a sensor and an area to the right of the on point threshold B is a usable range for a second state (e.g., a high state) of the sensor. The wider the distribution and the closer to a threshold the signal is, the more likely the signal will cross the threshold. Variation of signal strength associated with a sensor (e.g., the sensing component 114) can be induced by displacement of a target creating a valid change of state for the sensor. However, variation of signal strength associated with a sensor (e.g., the sensing component 114) can also be induced by unwanted changes (e.g., noise) such as mechanical vibration, electromagnetic perturbations, temperature variations, internal electrical noise, etc. In certain instances (e.g., if noise is too large or too powerful), an unwanted change of state for the sensor can occur.

In a non-limiting example, given an operating frequency (e.g., a switching frequency) at 1 kHz, a goal can be to have distance between mean of distributions (e.g., the first distribution 502 and the second distribution 504) and a corresponding thresholds at $7\sigma$. For example, the operating frequency (e.g., the switching frequency) can indicate how fast a sensor is transitioning from one state of the sensor to another state of the sensor (e.g., how many times per second the sensor is detecting an object and/or a changing state, etc.). An operation can be defined as transitioning to a different state and returning to an original state. An ideal scenario can occur when thresholds are centered on a middle between a low state mean $\mu_L$ equal to 1 and a high state mean $\mu_H$ equal to 7. If D is a distance between the first distribution 502 and the second distribution 504 (e.g., if distance is a difference between the low state mean $\mu_L$ and the high state mean $\mu_H$ so that $D=\mu_H-\mu_L$), then distance $D=14\sigma-H$ where H corresponds to hysteresis. For example, a hysteresis equal to 15% of a signal level associated with a sensor corresponds to about $1\sigma$. Therefore, a usable signal level for the high state can correspond to $13\sigma$ since distance $D=13\sigma$ when hysteresis is equal to $1\sigma$. Hysteresis is a difference between distance when a target can be detected (e.g., as the target moves towards a sensor) and distance the target is required to move away from a sensor to no longer be detected. Accordingly, to avoid false detection when in the low state for the non-limiting example, a turn-on point threshold must be at a minimum $7\sigma$ away from the center of the low state distribution (e.g., the first distribution 502), where $\sigma$ is the standard deviation of the signal amplitude distribution for the low state. As such, the signal in low state is unlikely to be large enough to switch the sensor into high state (e.g., crossing the high state threshold). Similarly, when in high state, a target (e.g., a reflector associated with a sensor) must be positioned at a distance relative to the sensor that generates a large enough signal level in order to avoid a missed detection. Accordingly, for the non-limiting example, the center of the distribution of the signal in high state (e.g., the second distribution 504) must be at least $7\sigma$ away from the low threshold. Distances in the signal strength domain can define sensing margins for a sensor (e.g., the sensing component 114).

Positions of a signal level distribution relative to decision thresholds in each state of a sensor relate directly to robustness and reliability of a sensor device. The further away a distribution is from a decision threshold (e.g., the greater the distance between a distribution and a decision threshold), the more robust the sensor device is for a particular application. The distance can be measured relative to standard deviation of the distribution. For example, a sensor device can be considered robust when center of the distribution is at least $7\sigma$ away from a corresponding decision threshold. When considering two distributions, distance between a High State distribution and a Low State distribution must be greater than $14\sigma$ in order for the sensor device to be considered robust. This minimum separation between two distributions defines a low margin area M as shown in FIG. 6.

Figure 6:
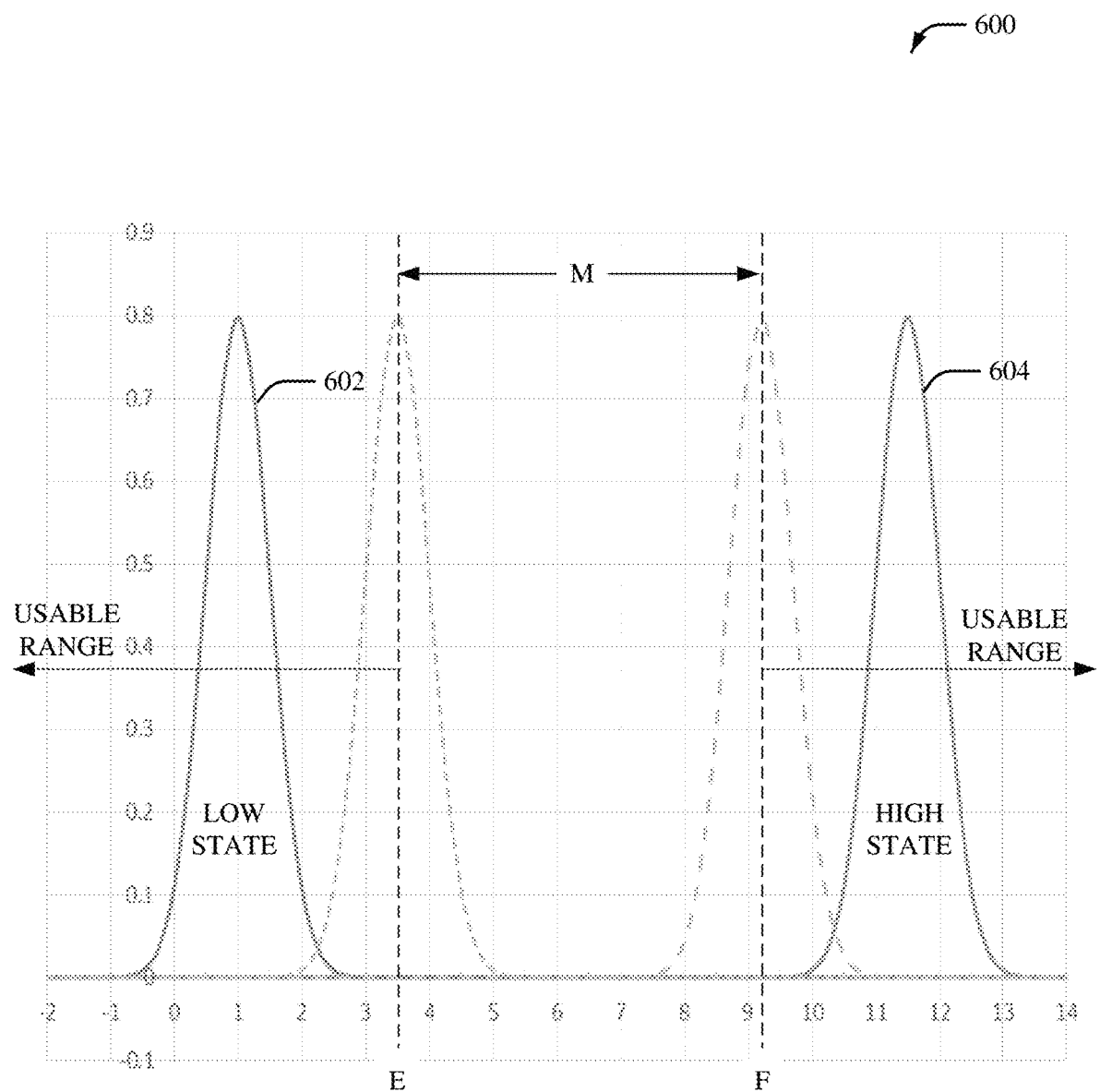
FIG. 6 illustrates another exemplary signal level distribution.

FIG. 6 represents a signal level distribution 600 associated with a sensor (e.g., the sensing component 114). In an aspect, the signal level distribution 600 can be associated with the signal distribution component 202 and the analysis component 302. Outside of the low margin area M are a usable range for a first state (e.g., a low state) of a sensor and a usable range for a second state (e.g., a high state) of the sensor. Being in the usable range for the first state (e.g., a low state) or the second state (e.g., a high state) of the sensor provides a high margin for improved robustness associated with a sensor device. The signal level distribution 600 includes a first distribution 602 associated with the low state and a second distribution 604 associated with the high state. The first distribution 602 can correspond the first distribution 502 included in the signal level distribution 500. The second distribution 604 can correspond to a modified version (e.g., a shifted version) of the second distribution 504 included in the signal level distribution 500. The threshold level E and the threshold level F associated with the signal level distribution 600 can define sensing margins for a sensor (e.g., the sensing component 114) associated with the signal level distribution 600. In the non-limiting example shown in FIG. 6, the threshold level E corresponds to the low threshold A associated with the signal level distribution 500, and the threshold level F is different than the high threshold B associated with the signal level distribution 500.

Changes in distribution characteristics can change the low margin area M and/or robustness for a sensor (e.g., the sensing component 114). In an aspect, the analysis component 302 can determine a measure of robustness for a sensor (e.g., the sensing component 114). The measure of robustness can correspond to a Signal Margin to Noise Ratio (SMNR). SMNR is defined as a ratio between distance of a center of a distribution to threshold over standard deviation of the distribution. For example, SMNR=$(\mu-\text{Threshold})/\sigma$. Each state of a sensor can comprise a SMNR. For example, SMNR for a high state of a sensor can be SMNR_H and SMNR for a low state of a sensor can be SMNR_L, where SMNR_H=$(\mu-T_L)/\sigma$ and SMNR_L=$(\mu-T_H)/\sigma$. In an example where hysteresis is below a certain size, a single threshold can be employed to determine SMNR for the high state and the low state of the sensor. For example, a SMNR value for the high state and the low state of the sensor can be SMNR_H/L=$(\mu-T_{H/L})/\sigma$, where a sensor threshold $T_{H/L}=(T_H+T_L)/2$. In one example, standard deviation is the same for the high state and the low state of the sensor, and mean for the high state and the low state of the sensor are different. In another example, standard deviation is different for the high state and the low state of the sensor, and mean for the high state and the low state of the sensor are different. In yet another example, SMNR is the same for the high state and the low state of the sensor if threshold is in the middle between the mean of the two distributions (e.g., the first distribution 602 associated with the low state and the second distribution 604 associated with the high state).

In an aspect, the analysis component 302 can determine a SMNR value (e.g., SMNR_s) based on an operating frequency in standard conditions, a noise distribution in standard conditions and/or factory calibration settings. For example, a sensing distance can be defined by setting a threshold according to a desired SMNR value for a low state of a sensor. Furthermore, an object can be placed away from the sensor a greater distance than the sensing distance for the high state of the sensor to achieve the same SMNR value as the low state of the sensor. Accordingly, a usable sensing range (e.g., Usable Sensing Distance (USD)) can be defined. Moreover, the threshold $T_{H/L}$ is therefore implemented in the middle between a usable sensing distance for the low state and the high state. In another aspect, the analysis component 302 can determine a SMNR value (e.g., SMNR_a) based on an application associated with the sensor and/or an environment associated with the sensor. Therefore, the analysis component 302 can determine a Margin to Noise (MN) that is defined as ratio between actual SMNR in the application and reference SMNR as determined for standard conditions, where MN=(SMNR_a)/(SMNR_s). Accordingly the low margin area M can decrease probability of a false outcome associated with a sensing decision, reduce level of noise at a decision point, reduce number of false alarms associated with a sensor, reduce number of missed detections associated with a sensor, improve repeatability of sensing decisions, allow sensing conditions associated with a sensor to degrade, etc.

Figure 7:
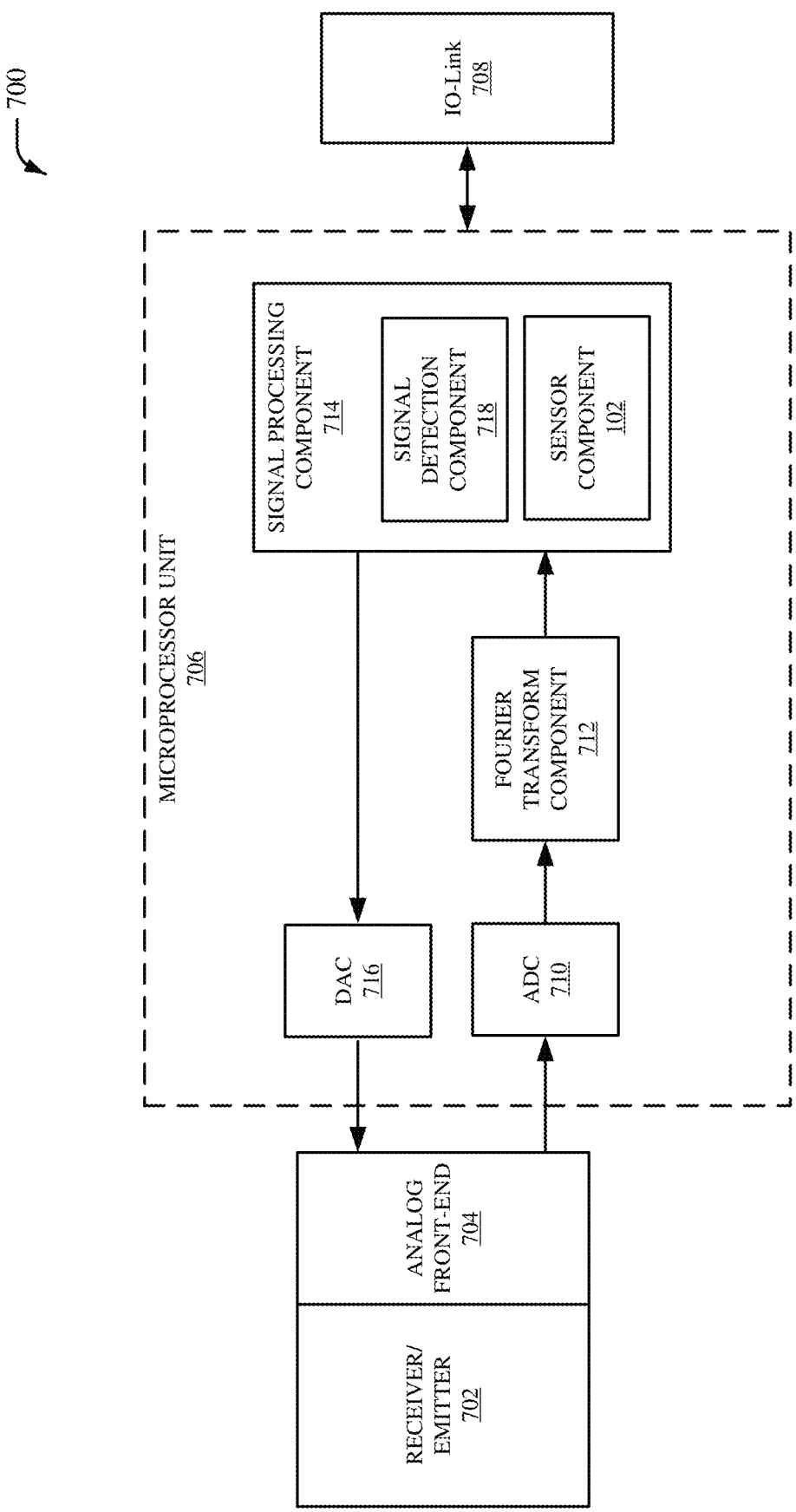
FIG. 7 illustrates an exemplary sensor system that includes the sensor component, in accordance with various aspects and implementations described herein.

FIG. 7 illustrates an example sensor system 700 that includes the sensor component 102. The sensor system 700 can include a receiver/emitter 702, an analog front-end 704, a microprocessor unit 706 and/or an IO-Link 708. The microprocessor unit 706 can include, for example, an ADC 710, a Fourier transform component 712, a signal processing component 714 and/or a DAC 716. The signal processing component 714 can include and/or be associated with the sensor component 102. Additionally, the signal processing component 714 can include, for example, a signal detection component 718. In an implementation, the receiver/emitter 702 can include one or more transducers that can be configured as a receiver and/or an emitter. For example, magnitude of energy associated with the receiver/emitter 702 can be converted into a signal that varies proportionally to variations of the energy. In another implementation, the receiver/emitter 702 can include a capacitive probe and/or plate (e.g., sensor electrodes and/or compensator electrodes) that can be configured as a receiver and/or an emitter. In yet another implementation, the receiver/emitter 702 can include a light emitting diode (LED) light detector (e.g., a photodiode, a phototransistor, etc.) and/or an LED light source that can be configured as a receiver and/or an emitter. In yet another implementation, the receiver/emitter 702 can include a coil and/or ferrite core assembly that can be configured as a receiver and/or an emitter. A signal generated based on the receiver/emitter 702 can be received by the analog front-end 704. The analog front-end 704 can include an amplifier, a filter (e.g., a low-pass filter, etc.) and/or another component to condition the signal. In an aspect, the receiver/emitter 702 and/or the analog front-end 704 can be implemented as a sensing device (e.g., a sensor). For example, the receiver/emitter 702 and/or the analog front-end 704 can be associated with the sensing component 114.

The microprocessor unit 706 can receive the signal conditioned by the analog front-end 704 for further processing. For example, the ADC 710 can receive the signal conditioned by the analog front-end 704. The ADC 710 can be an analog to digital converter that can convert the signal (e.g., an analog signal) into a digital signal. The digital signal generated by the ADC 710 can be further processed by the Fourier transform component 712. For example, the Fourier transform component 712 can process the digital signal based on one or more Fourier transform algorithms. The signal processing component 714 can be configured for signal detection to detect and/or signal a changing condition (e.g., presence of an object, absence of an object, change in distance, etc.) based on the signal received by the microprocessor unit 706 (e.g., the signal generated based on the receiver/emitter 702). For example, the signal detection component 718 can be associated with detection decision logic based on sensing margins, a threshold comparator, etc. Therefore, the signal detection component 718 can receive sensor data via the signal generated based on the receiver/emitter 702 (e.g., the signal generated based on at least one transducer coupled to the analog front-end 704 and/or the ADC 710, the signal generated based on a photodiode, the signal generated based on a phototransistor, the signal generated based on a coil and/or ferrite core assembly, etc.). Additionally, the signal processing component 714 can include the sensor component 102 to configure sensing margin, as more fully disclosed herein. For example, the sensor component 102 can include the statistics component 104 (e.g., the signal distribution component 202 and/or the analysis component 302), the margin component 106, the output component 108 and/or the diagnostic component 402. In an implementation, the signal processing component 714 can be associated with flash memory.

In an aspect, sensing margins (e.g., operating margins) and/or an indicator generated by the sensor component 102 can be received by the IO-Link 708. The IO-Link 708 can be associated with point-to-point communication and/or a connectivity protocol to communicate data to other components associated with the sensor system 700. For example, the IO-Link 708 can be a physical interface. In a non-limiting example, the IO-Link 708 can communicate data to an actuator device. The DAC 716 can be a digital to analog converter that can convert a signal processed by the signal processing component 714 (e.g., a digital signal) into an analog signal. In certain implementations, the microprocessor unit 706 can additionally be associated with control and/or parameter calibration, a behavioral state machine, one or more IO drivers, one or more application programming interfaces, a timer, electrically erasable programmable read-only memory (EEPROM), random-access memory, a microcontroller unit, and/or other sensor functionality.

FIGS. 8-11 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 8:
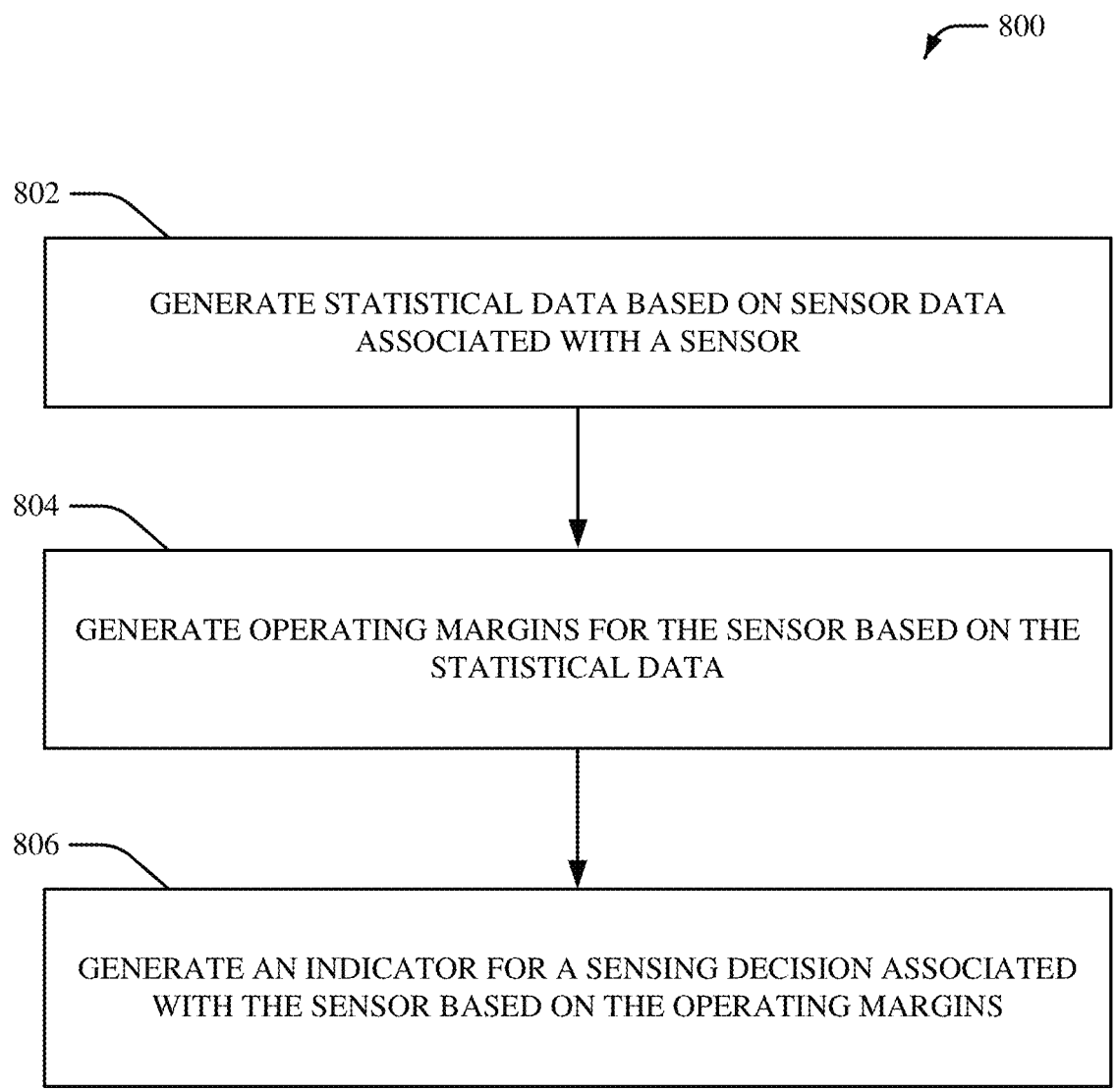
FIG. 8 is a flowchart of an example methodology for configuring operating margins for a sensor.

FIG. 8 illustrates an example methodology 800 for configuring operating margins for a sensor. Initially, at 802, statistical data is generated based on sensor data associated with a sensor. For example, statistical mean data, standard deviation data, variation data, noise level data, signal to noise ratio data, noise distribution data, statistical median data, statistical mode data and/or other statistical data associated with the sensor data can be generated. At 804, operating margins for the sensor are generated based on the statistical data. For example, operating margins for the sensor can be determined and/or modified based on the statistical data. At 806, an indicator for a sensing decision associated with the sensor is generated based on the operating margins. The indicator can be associated with modulation of one or more light sources (e.g., one or more light-emitting diodes, etc.). Additionally or alternatively, the indicator can be associated with a signal sent to an industrial device or controller, a message sent to a display device (e.g., a human-machine interface, a user device, a personal mobile device, etc.), etc.

Figure 9:
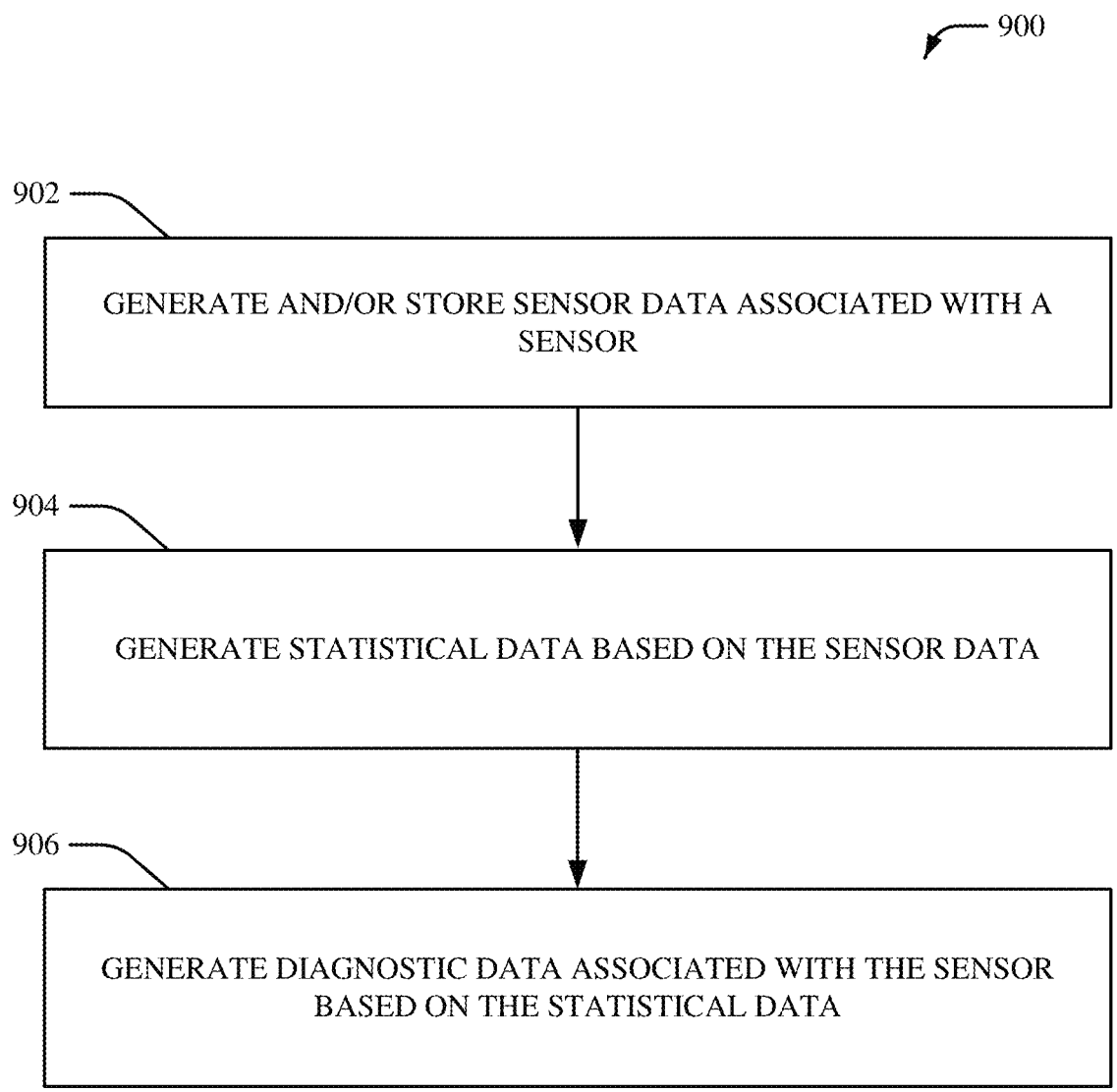
FIG. 9 is a flowchart of an example methodology for determining diagnostic data associated with a sensor.

FIG. 9 illustrates an example methodology 900 for determining diagnostic data associated with a sensor. Initially, at 902, sensor data associated with a sensor is generated and/or stored. For example, sensor data (e.g., measurement data associated with the sensor) can be generated and/or stored as signal distribution data. At 904, statistical data is generated based on the sensor data. For example, statistical mean data, standard deviation data, variation data, noise level data, signal to noise ratio data, noise distribution data, statistical median data, statistical mode data and/or other statistical data associated with the sensor data can be generated. At 906, diagnostic data associated with the sensor is generated based on the statistical data. The diagnostic data can be associated with, for example, performance of the sensor. In an aspect, a signal associated with diagnostic data can be generated. For, a warning signal can be generated in response to a particular characterization of the signal distribution data. A signal associated with diagnostic data can be sent to an industrial device or controller to perform a control action, can initiate a safety action (e.g., removing power from an industrial device, switching a mode of an industrial device, etc.), be associated with a diagnostic message to a display device (e.g., a human-machine interface, a user device, a personal mobile device, etc.), etc.

Figure 10:
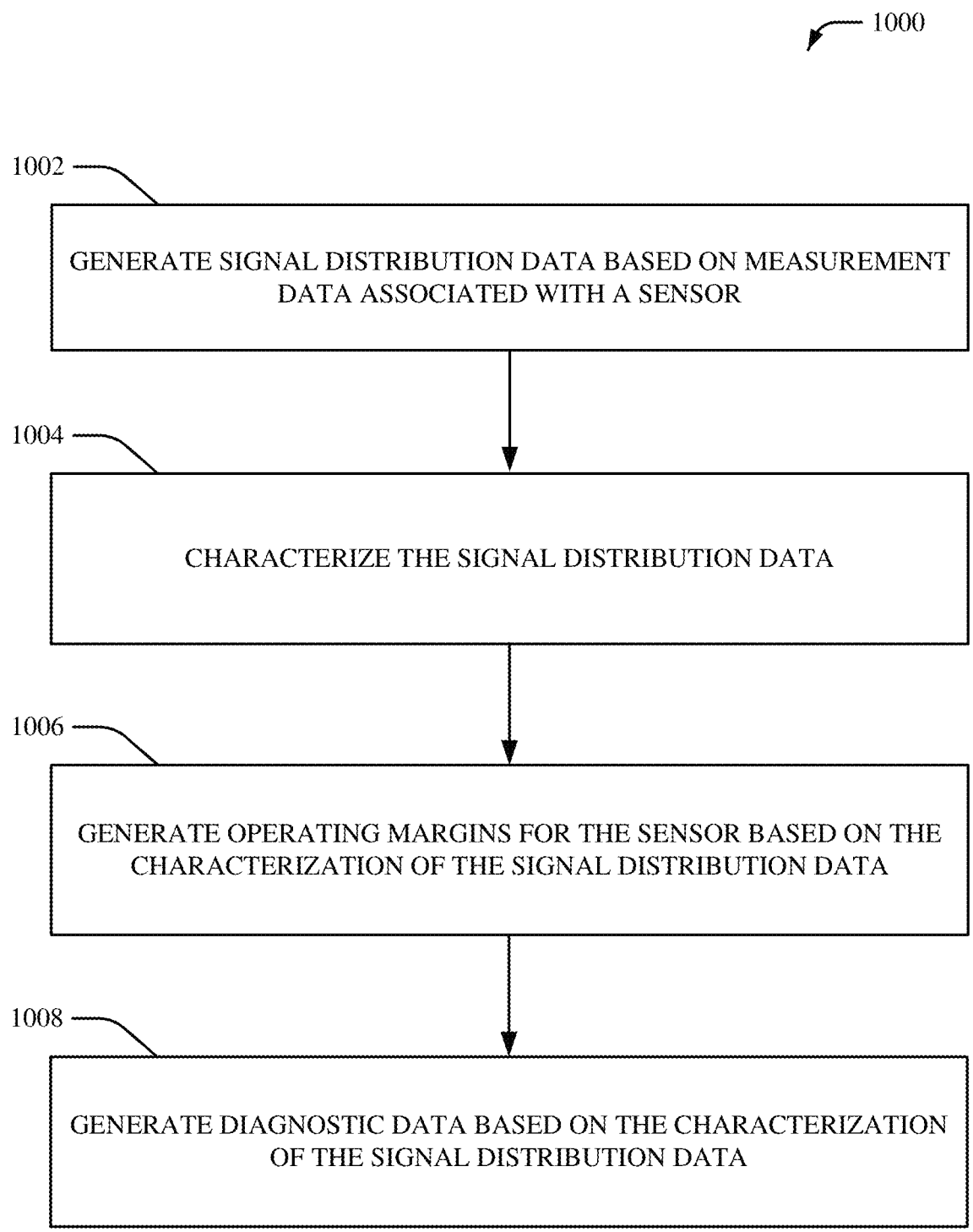
FIG. 10 is a flowchart of an example methodology for configuring operating margins and/or determining diagnostic data associated with a sensor.

FIG. 10 illustrates an example methodology 1000 for configuring operating margins and/or determining diagnostic data associated with a sensor. Initially, at 1002, signal distribution data is generated based on measurement data associated with a sensor. For example, a distribution of measurement data associated with signals received and/or generated by the sensor can be determined. At 1004, the signal distribution data is characterized. For example, statistical characteristics, signal level statistics, and/or patterns associated with the signal distribution data can be determined. In an aspect, characterization of the signal distribution data can be associated with statistical mean data, standard deviation data, variation data, noise level data, signal to noise ratio data, noise distribution data, statistical median data, statistical mode data and/or other statistical data. At 1006, operating margins for the sensor are generated based on the characterization of the signal distribution data. At 1008, diagnostic data is generated based on the characterization of the signal distribution data.

Figure 11:
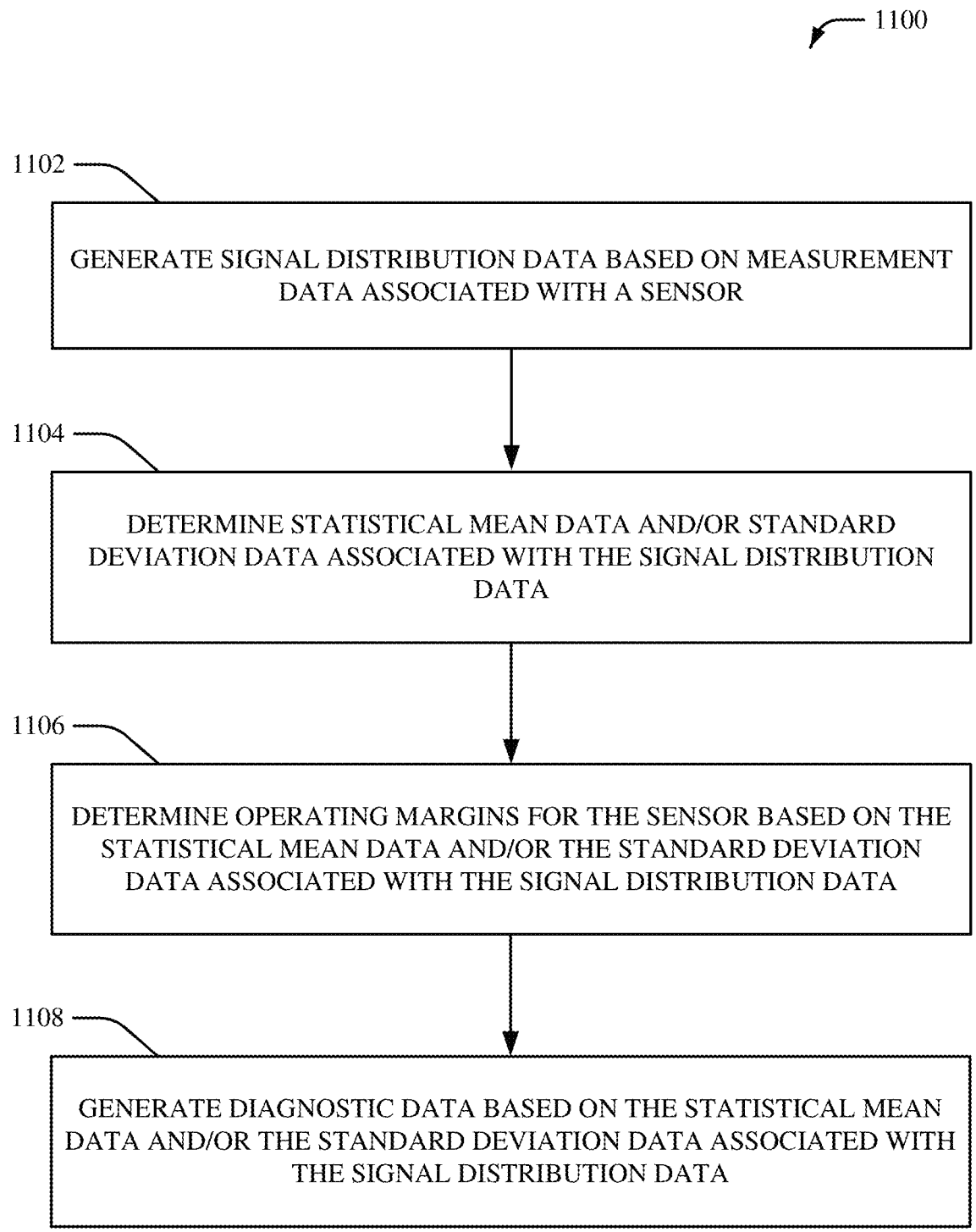
FIG. 11 is a flowchart of another example methodology for configuring operating margins and/or determining diagnostic data associated with a sensor.

FIG. 11 illustrates an example methodology 1100 for configuring operating margins and/or determining diagnostic data associated with a sensor. Initially, at 1102, signal distribution data is generated based on measurement data associated with a sensor. At 1104, statistical mean data and/or standard deviation data associated with the signal distribution data is determined. Additionally, variation data, noise level data, signal to noise ratio data, noise distribution data, statistical median data, statistical mode data and/or other statistical data associated with the signal distribution data can be determined. At 1106, operating margins for the sensor are determined based on the statistical mean data and/or the standard deviation data associated with the signal distribution data. At 1108, diagnostic data is generated based on the statistical mean data and/or the standard deviation data associated with the signal distribution data.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term controller (e.g., PLC or automation controller) as used herein can include functionality that can be shared across multiple components, systems, and/or networks. As an example, one or more controllers (e.g., one or more PLCs or automation controllers) can communicate and cooperate with various network devices across a network. This can include substantially any type of control, communications module, computer, Input/Output (I/O) device, sensor, actuator, and human machine interface (HMI) that communicate via the network, which includes control, automation, and/or public networks. The controller (e.g., PLC or automation controller) can also communicate to and control various other devices such as standard or safety-rated I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
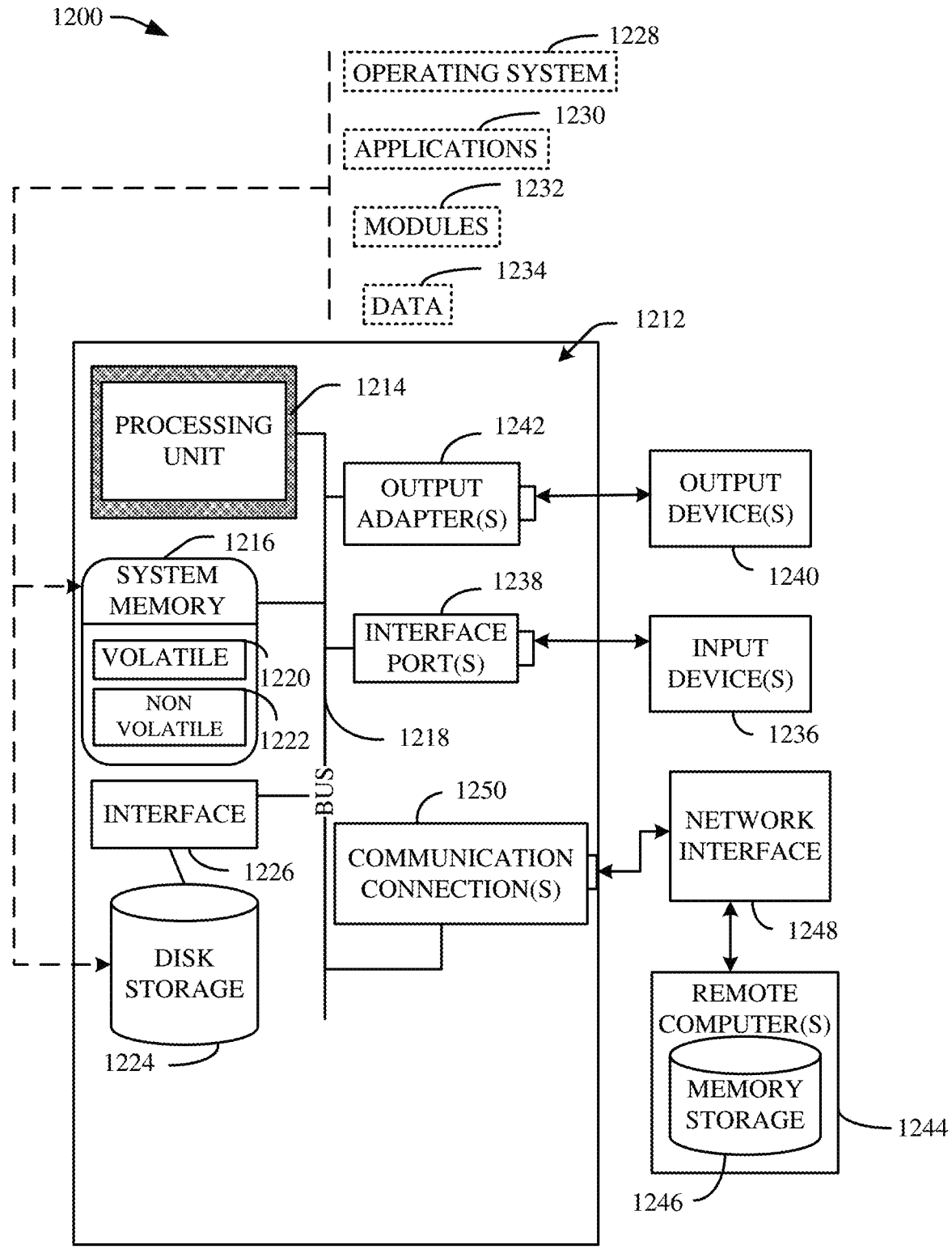
FIG. 12 is an example computing environment.
Figure 13:
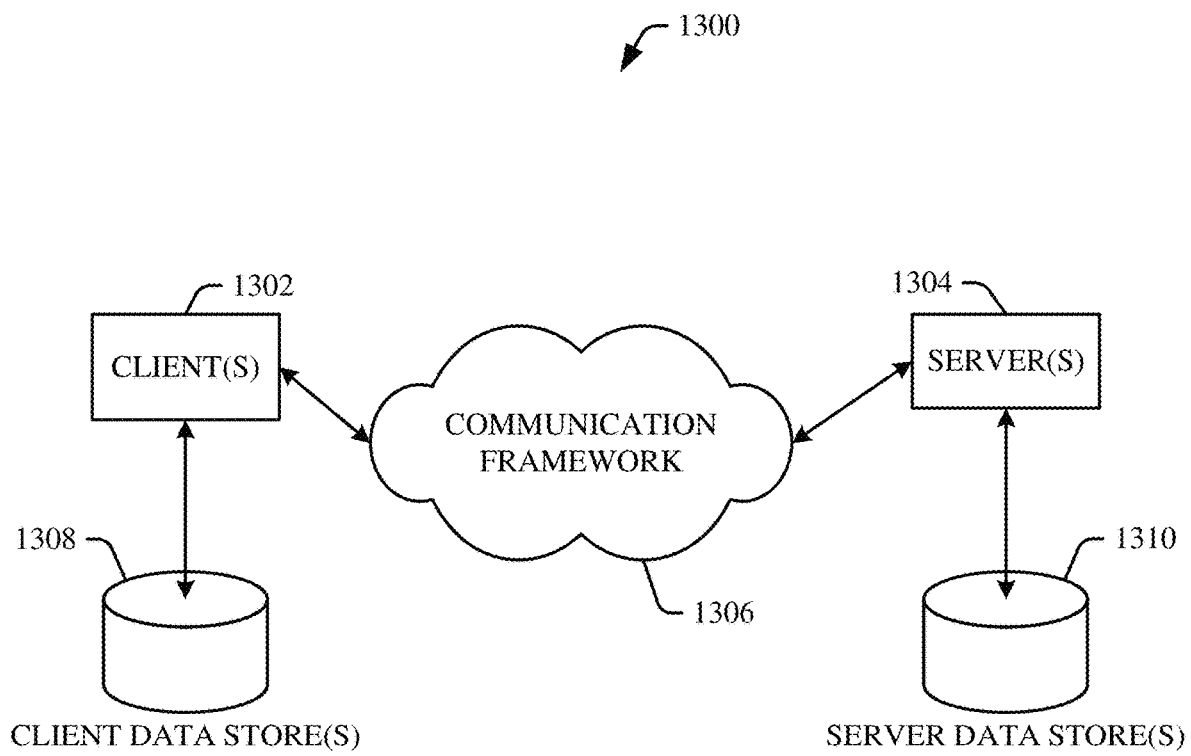
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, an example environment 1210 for implementing various aspects of the aforementioned subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores computer executable components;
a processor that executes computer executable components stored in the memory, wherein the computer executable components comprise:
a receiving component that receives sensor data from a sensor device, wherein the sensor data comprises sensed values that differs from a threshold value indicating an object monitored by the sensor device is in a defined state;
a statistics component configured to generate statistical data based on the sensed values representative of the object being in the defined state;
a margin component configured to generate a sensing margin for the sensor device based on the statistical data, wherein the sensing margin is generated in response to a determination that an average value of the sensed values differs from the threshold value by a defined multiple of a standard deviation; and
an output component that configures the sensor device according to the sensing margin.

2. The system of claim 1, wherein the statistics component determines the standard deviation based on a distribution of the sensed values.

3. The system of claim 1, wherein the average value is a mean average.

4. The system of claim 1, wherein the margin component selects the sensing margin based on a quantity of the defined multiple.

5. The system of claim 1, wherein the statistics component is configured to generate signal distribution data based on the distributions of the sensor data.

6. The system of claim 5, wherein the margin component is configured to generate the sensing margin for the sensor device based on a characterization of the signal distribution data relative to a previously determined sensing margin for the sensor device.

7. The system of claim 5, wherein the margin component is configured to generate the sensing margin for the sensor device based on statistical mean data of the signal distribution data relative to a previously determined sensing margin for the sensor device.

8. The system of claim 5, further comprising a diagnostic component configured to generate a warning signal that indicates at least a portion of the sensor device or at least a portion of the object requires service in response to a determination of a change in the signal distribution data.

9. The system of claim 1, wherein the margin component is configured to generate the sensing margin for the sensor device based on a determined noise level of the sensor data.

10. The system of claim 1, wherein the margin component is configured to generate the sensing margin for the sensor device based on a signal margin to noise ratio (SMNR) of the sensor data.

11. The system of claim 1, wherein the margin component is configured to generate the sensing margin for the sensor device based on a noise distribution of the sensor data.

12. The system of claim 1, further comprising the sensor device, wherein the sensor device receives signals representative of the object and transforms the signals to the sensor data having measured values indicative of defined states of the object.

13. A non-transitory computer-readable medium, comprising executable instructions that, when executed by a processor, facilitate performance of operations, comprising:
receiving, from a sensor device, sensor data comprising sensed values that differs from a threshold value indicating an object monitored by the sensor device is in a defined state;
determining statistical data based on the sensed values representative of the object being in the defined state;
determining a sensing margin for the sensor device based on the statistical data, wherein the sensing margin is determined in response to a determination that an average value of the sensed values differs from the threshold value by a defined multiple of a standard deviation; and programming a sensing margin setting of the sensor device according to the sensing margin.

14. The non-transitory computer-readable medium of claim 13, further comprising determining the standard deviation based on a distribution of the sensed values.

15. The non-transitory computer-readable medium of claim 13, wherein the determining the sensing margin further comprises determining the sensing margin based on a size of the defined multiple.

16. The non-transitory computer-readable medium of claim 13, wherein the determining the sensing margin further comprises determining the sensing margin based on a determined noise level of the sensor data.

17. A method, comprising:
   receiving, by a device comprising a processor, sensor data comprising sensed values that differs from a threshold value indicating an object monitored by a sensor device is in a defined state;
   determining, by the device, statistical data based on the sensed values representative of the object being in the defined state;
   determining, by the device, a sensing margin for the sensor device based on the statistical data, wherein the sensing margin is determined in response to a determination that an average value of the sensed values differs from the threshold value by a defined multiple of a standard deviation; and
   updating, by the device, a sensing margin setting of the sensor device according to the sensing margin.

18. The method of claim 17, wherein the determining the sensing margin further comprises determining, by the device, the sensing margin based on a size of the defined multiple.

19. The method of claim 17, wherein the determining the sensing margin further comprises determining, by the device, the sensing margin based on a signal margin to noise ratio (SMNR) of the sensor data.

20. The method of claim 17, wherein the determining the sensing margin further comprises determining, by the device, the sensing margin based on a noise distribution of the sensor data.

\* \* \* \* \*